(12) United States Patent
Sumi et al.

(10) Patent No.: US 7,837,552 B2
(45) Date of Patent: Nov. 23, 2010

(54) COMPUTER PROGRAM PRODUCT (75) Inventors: Masayuki Sumi, Tokyo (JP); Junichiro Matsuura, Tokyo (JP); Takeshi Yamaguchi, Tokyo (JP); Masaru Moriguchi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 679 days.

(21) Appl. No.: 10/682,418

(22) Filed: Oct. 10, 2003

(65) Prior Publication Data
US 2005/0026684 A1 Feb. 3, 2005

(30) Foreign Application Priority Data
Oct. 11, 2002 (JP) ............... 2002-299521

(51) Int. Cl.
A63F 13/00 (2006.01)
A63F 9/24 (2006.01)

(52) U.S. Cl. ............... 463/23; 463/1; 463/31

(58) Field of Classification Search ........... 463/1–2, 463/30–34, 38, 23; 345/419, 473, 165
See application file for complete search history.

(56) References Cited

U.S. PATENT DOCUMENTS

| 4,059,266 | A | * | 11/1977 | Nakamura | ........... | 273/442 |
| 5,583,407 | A | * | 12/1996 | Yamaguchi | ........... | 318/551 |
| 5,853,324 | A | * | 12/1998 | Kami et al. | ........... | 463/2 |
| 6,132,313 | A | * | 10/2000 | Yamaguchi | ........... | 463/36 |
| 6,323,858 | B1 | * | 11/2001 | Gilbert et al. | ........... | 345/419 |
| 6,379,249 | B1 | * | 4/2002 | Satsukawa et al. | ........... | 463/31 |
| 6,501,478 | B1 | * | 12/2002 | Kawakami et al. | ........... | 345/474 |
| 6,504,539 | B1 | * | 1/2003 | Hiraki | ........... | 345/427 |
| 6,582,299 | B1 | * | 6/2003 | Matsuyama et al. | ........... | 463/2 |
| 6,664,965 | B1 | * | 12/2003 | Yamamoto et al. | ........... | 345/473 |
| 6,967,650 | B1 | * | 11/2005 | Hanai et al. | ........... | 345/419 |
| 6,972,756 | B1 | * | 12/2005 | Yamamoto | ........... | 345/419 |
| 7,160,191 | B2 | * | 1/2007 | Matsumoto | ........... | 463/31 |

FOREIGN PATENT DOCUMENTS

JP 2000116946 A * 4/2000
JP 2000-296267 A 10/2000

(Continued)

OTHER PUBLICATIONS

Namco, 'Time Crisis 2', Killer List of Video Games via www.klov.com [online], 1998, [retrieved on Apr. 13, 2006]. Retrieved from internet: <URL: http://www.klov.com/game_detail.php?game_id=10115>.*

(Continued)

Primary Examiner—John M. Hotaling, II
Assistant Examiner—Ryan Hsu
(74) Attorney, Agent, or Firm—Finnegan, Henderson, Farabow, Garrett & Dunner, L.L.P.

(57) ABSTRACT

An object of the present invention is to propose image processing technology whereby even a player with a low skill level can enjoy a shooting game with more excitement. To achieve this object, according to the present invention, if a player outputs a slow regeneration request signal when processing transits to the status where an enemy-character is about to fire a bullet, the enemy-character and the bullet fired by the enemy-character are regenerated slowly. By this, the player can aim at the bullet with extra time.

15 Claims, 3 Drawing Sheets

FOREIGN PATENT DOCUMENTS

| | | |
|---|---|---|
| JP | 2001-353367 A | 12/2001 |
| JP | 2002-219278 A | 8/2002 |
| WO | WO 99/27498 | 6/1999 |

OTHER PUBLICATIONS

Davis, Ryan, 'Time Crisis II: Review', Namco via www.gamespot. com [online], Oct. 4, 2001, [retrieved on Oct. 4, 2001]. Retrieved from Internet: <URL: http://www.gamespot.com/ps2/action/timecrisis2/review.html>.*

Namco, 'Time Crisis 2', Namco via www.answers.com [online], [retrieved on Sep. 26, 2006]. retrieved from the Internet: <URL: http://www.answers.com/main/ntquery?tname=time%2Dcrisis%2Dii&print=true >.*

Farkas, "Diablo II: Ultimate Strategy Guide", Brady Publishing, 2001, p. 64-65,73.*

Kasavin Greg, "Max Payne", Jul. 27, 2001, www.gamespot.com for Remedy Entertainment Inc., retrieved from Internet [Aug. 26, 2008] via URL:<http://www.gamespot.com/pc/action/maxpayne/review.html>.*

Unknown, "Max Payne Review", retrieved from www.giantbomb.com [Aug. 26, 2008] via URL:<http://www.giantbomb.com/max-payne/61-2414/>.*

Notice of Reasons for Refusal from the Japanese Patent Office, mailed Aug. 16, 2006, in Japanese Patent Application No. 2002-299521.

English Language Translation of Notice of Reasons for Refusal.

"Monthly Arcadia, Apr. 2001 (Mobile Suit Gundam VS Geon)", vol. 2, No. 4, Apr. 1, 2001, Enterbrain, pp. 26-31.

Partial English Language Translation of "Monthly Arcadia, Apr. 2001 (Mobile Suit Gundam VS Geon)."

"SHOCK Play Station, Apr. 23, 1999 (Xybemetic Empire)", vol. 5, No. 9, Apr. 23, 1999, Media Works, pp. 34-35.

Partial English Language Translation of "SHOCK Play Station, Apr. 23, 1999 (Xyberntic Empire)."

* cited by examiner

TIME SCALE CONVERSION TABLE

| OBJECT | BEFORE CONVERSION | AFTER CONVERSION |
|---|---|---|
| ENEMY-CHARACTER | 1.0 | 1/n |
| BULLET OF ENEMY-CHARACTER | 1.0 | 1/n |

COMPUTER PROGRAM PRODUCT

This application claims priority under 35 U.S.C. §119 to Japanese Patent Application No. 2002-299521, filed Oct. 11, 2002, which is incorporated herein by reference.

BACKGROUND OF THE INVENTION

1. Field of the Invention

The present invention relates to image processing technology suitable for shooting games.

2. Description of the Related Art

Japanese Patent Application Laid-Open No. H11-86038 discloses image processing technology for shooting games using computer graphics. In such shooting games, while a status of a player-character which the player operates, and an enemy-character, which is the target of the shooting of the player who shoot at each other, are displayed as an image viewed from a predetermined viewpoint on a screen, a shooting game is performed, but in image processing, if the shooting input is detected in a status where the shooting target and the coordinates of the aiming position match in a frame, the image of the shooting target being shot at is written in the frame memory, and this is converted into video signals and displayed as an image in the next frame, so the status of the bullet flying is not displayed on the screen, only the flying locus of the bullet is temporarily displayed.

In the above image processing, however, the flying time of the bullet is virtually 0, so if the player-character is fired at by an enemy character, the player-character is always shot at and cannot avoid the bullet as long as the player-character and the aim match. Particularly in the case of a beginner, whose skill level is not high, the game ends in a short time, so improvements so that players do not become bored are necessary.

SUMMARY OF THE INVENTION

With the foregoing in view, it is an object of the present invention to provide an image processing technology suitable for shooting games.

To solve the above problem, the computer program product of the present invention is a computer program product where a player-character, who virtually fires bullets responding to the input operation of a player, and an enemy-character, who is computer-controlled to virtually fire bullets at the player-character, are disposed in a virtual space, and a computer program for causing a computer system to execute processing for displaying a status in the virtual space viewed from a virtual viewpoint on a screen is recorded in a computer-readable recording medium, wherein the computer program causes this computer system to determine whether a visual effects request for requesting visual effects processing was input by a player, and if the visual effects request was input, the computer program causes the computer system to execute image display processing with visual effects such that the display speed of at least the enemy-character and each one of the bullets fired from the enemy-character becomes slower than the display speed of the object displayed in association with the player operation, causes the computer system to determine whether at least one of the enemy-characters to be the shooting target and the bullet fired from the enemy-character will collide with the moving locus of the bullet fired from the player-character, and if the shooting target will collide with the moving locus of the bullet fired from the player-character, the computer program causes the computer system to display the image of the shooting target being shot at on the screen, and displays the progress amount of the remaining time when image display processing with visual effects can be executed on the screen.

According to the present invention, the player voluntarily requests visual effects processing on the condition that the enemy-character transits to bullet firing wait status, then the enemy-character and the bullet fired from this enemy character are slowly regenerated, therefore the player can shoot aiming at the enemy character or at this bullet with extra time, which makes a shooting game more exciting.

In the computer program product of the present invention, the computer program causes the computer system to determine whether processing transits to bullet fire wait status where a bullet is fired from the enemy-character to the player-character at least within a predetermined time, and if processing transits to the bullet fire wait status, the computer program causes the computer system to determine whether a player input the visual effects request.

In the computer program product of the present invention, the computer program causes the computer system to measure the elapsed time amount at which image display processing with visual effects is not executed, and increase the remaining time according to the elapsed time amount. By this, time when the visual effects processing can be executed can be increased, so a shooting game can be more exciting.

In the computer program product of the present invention, the computer program causes the computer system to determine whether the mode is a mode where two or more players play, and update the remaining time so that the increasing amount of remaining time, when it is determined that the mode is a mode where two or more players play, becomes different from the increasing amount of remaining time in a mode where one player plays. By this, time when the visual effects processing can be executed can be adjusted according to the play mode, so a shooting game can be more exciting.

In the computer program product of the present invention, the computer program causes the computer system to determine whether the image display processing with visual effects is being executed, and if determined that the image display processing with visual effects is being executed, the computer program causes the computer system to execute image effects processing for changing the display mode visually before and after the image display processing with visual effects is executed for at least the enemy-character. By executing the image effects processing so that the display mode of the enemy-character is changed before and after the visual effects processing, a shooting game can be more exciting.

It is preferable that the visual effects request input is a control signal which is output to the computer system when a foot pedal, connected to the computer system, is stepped on by a player. In a shooting game, manual input is normally used, but by controlling input using the foot, a player can focus only on manual input for shooting.

For the computer readable recording medium, an optical recording medium (a recording media where data can be optically read, such as CD-RAM, CD-ROM, DVD-RAM, DVD-ROM, DVD-R, PD disk, MD disk and MO disk), a magnetic recording medium (a recording medium where data can be magnetically read, such as a flexible disk, magnetic card and magnetic tape), or a portable recording medium, such as a memory cartridge comprising a memory element (a semiconductor memory element such as DRAM, a ferroelectric memory element such as FRAM), are preferable.

DESCRIPTION OF THE PREFERRED EMBODIMENTS

Preferred embodiments of the present invention will now be described with reference to the accompanying drawings.

Figure 1:
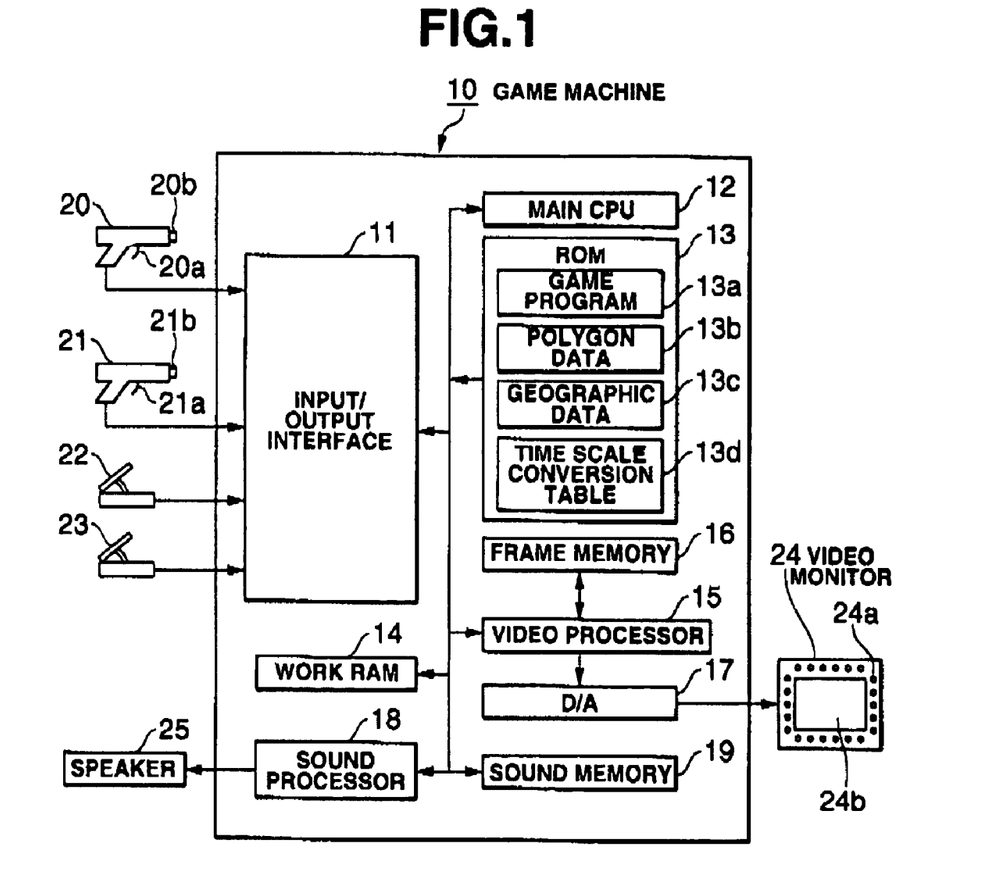
FIG. 1 is a block diagram depicting the hardware of a game machine according to the present embodiment.

FIG. 1 is a block diagram depicting the hardware of a game machine according to the present embodiment. As FIG. 1 shows; to the game machine 10, gun-type controllers 20 and 21 and foot pedals 22 and 23 as the input means for the player to control the game, a video monitor (CRT display) 24 as the image display means for displaying the game, and a speaker 25 as the sound output means for outputting sound effects, are connected respectively. The gun type controller 20 and the foot pedal 22 are the means for player A to control input, and the gun type controller 21 and the foot pedal 23 are the means for player B to control input. In other words, in a same virtual space, two players can execute a shooting game simultaneously. The present embodiment shows the system configuration for two players as an example, but the system is not limited to this, but is designed such that a plurality of players can play by adding gun type controllers.

Gun type controllers 20 and 21 are controllers which have such an appearance as a machine gun, pistol, rifle and shot gun, and comprise trigger switches 20a and 21a for the player to instruct firing bullets, and infrared emitters 20b and 21b for emitting infrared radially. By the input operation of the trigger switches 20a and 21a, infrared is emitted from the infrared emitters 20b and 21b to the video monitor 24. On the video monitor 24, a plurality of light receiving sensors 24a are disposed surrounding the frame of the screen 24b, and the sensor output of the light receiving sensor 24a is written to the input/output interface 11. The input signals (trigger control signals) of the trigger switches 20a and 21a by the player are output to the input/output interface 11 in the game machine 10. Foot pedals 22 and 23, on the other hand, are input means for the player to execute foot input for the main CPU 12 to execute the later mentioned visual effects processing, and if it is detected that foot pedals are pressed down with a predetermined stepping amount, a foot input signal is output to the input/output interface 11. The visual effects processing will be described in detail later.

The game machine 10 is comprised of an input/output interface 11, main CPU 12, ROM 13, work RAM 14, video processor 15, frame memory 16, D/A converter 17, sound processor 18 and sound memory 19. The input/output interface 11 determines the aiming position of the player, the presence of a fired bullet, and the number of fired bullets from the sensor output signals and the trigger control signals of the light receiving sensor 24a, and writes the corresponding flag to a predetermined address in the work RAM 14. The work RAM 14 is a random access memory which functions as a work area for the main CPU 12 to execute various operations for game processing. In the ROM 13, a game program 13a, polygon data 13b, geographic data 13c and time scale conversion table 13d are stored respectively. When the system is started up, the game program 13a, loaded in the work RAM 14, is command-interpreted and executed by the main CPU 12, and game processing is executed.

The polygon data 13b is a data group of the relative coordinates or the absolute coordinates of each vertex of a plurality of polygons constituting various objects (e.g. characters and game backgrounds) to be displayed on the game screen. The geographic data 13c, where a virtual viewpoint moves in the virtual space according to developments of the game, is a data group of relative coordinates or absolute coordinates of each vertex of polygons, which have relatively rough settings, required for displaying a desired game screen. The time scale conversion table 13d is a table where the values of the time scale of all the objects displayed on the game screen are stored, and are set such that the time scale of a predetermined object is changed at the later mentioned visual effects processing. Here the time scale is a multiplication coefficient of a moving vector (or moving amount) of an object in one frame unit, and is normally set to 1.0.

For determining the contact of the aiming and the shooting target, it is determined which position on the two-dimensional coordinates that a player is aiming at by the sensor output signal of the light receiving sensor 24a, then the two-dimensional coordinates are converted into three-dimensional coordinates, and a bullet is virtually fired in the depth direction. If the later mentioned visual effects processing is not executed, the image of the target being shot at is displayed at the aiming position, and the status of the bullet flying is not displayed, but if the visual effects processing is executed, the status of the bullet flying is written in the frame memory 16 for several frames, and the flying bullet is displayed on the video monitor 24 for a predetermined time.

In the above description, a light receiving sensor 24a is disposed on the video monitor 24, and the aiming position of a player is judged from the output signal of this sensor, but the present invention is not limited to this, and it is acceptable that a plurality of infrared light emitting elements, instead of the light receiving sensor 24a, are disposed on the video monitor 24, lights emitted from the light emitting elements are detected by the light receiving sensor disposed in a gun type controller, and the aiming position of the player is determined according to the received light intensity from each infrared light emitting element.

Figure 2:
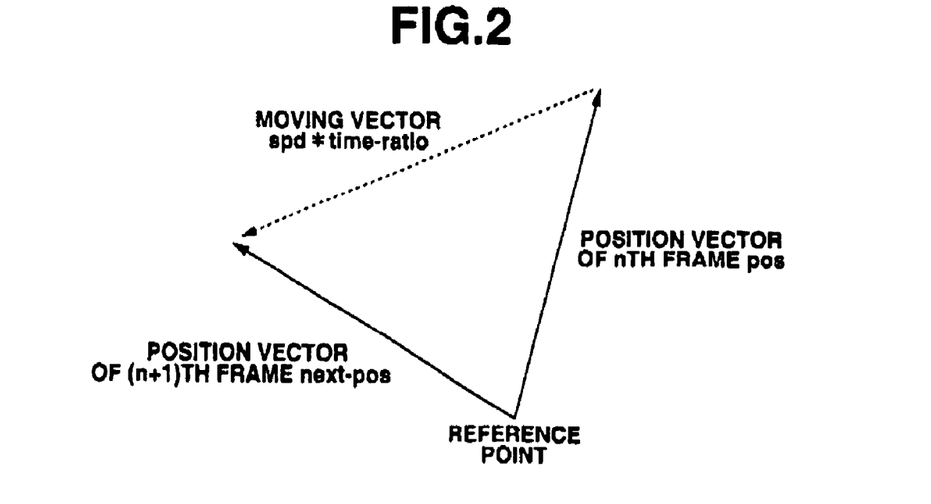
FIG. 2 is a diagram depicting the moving vector of an object.

FIG. 2 is a diagram depicting the moving vector of an object. In FIG. 2, if it is assumed that the position vector of an object at the nth frame is pos, the position vector of an object at the (n+1) the frame is next_pos, and the moving vector of an object is spd*time_ratio, then next_pos=pos+spd*time_ratio is established. Here spd is a moving speed (moving amount for each frame) of an object, and time_ratio is a time scale. When the visual effects processing, such as slow regeneration, is executed, the moving speed of the object can be set to 1/n of normal speed by changing the time scale from 1.0 to 1/n (1≦n). In the time scale conversion table 13d, an object for which the time scale is changed when the visual effects processing, such as slow regeneration, is executed, and the corresponding time scale of the object before and after time scale conversion, are stored in advance.

Figure 4:
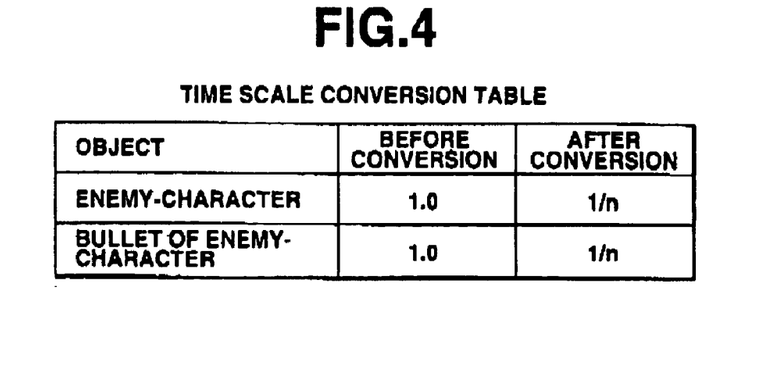
FIG. 4 is a table showing the registration content of a time scale conversion table.

FIG. 4 shows the content of the data registered in the time scale conversion table 13d, where the time scale of an enemy-character and the bullet fired by this enemy-character are registered respectively. Here the time scale before conversion is 1.0 and the time scale after conversion is 1/n.

The main CPU 12 reads the polygon data 13b, geographic data 13c and time scale conversion table 13d based on the game program 13a, determines the coordinate value of each object in the world coordinate system based on the control signal from such input means as the gun type controllers 20 and 21, and converts this coordinate value into the visual field coordinate system in a conversion matrix. The video processor 15 pastes texture to the object converted into the visual coordinate system, and writes the drawing data to be displayed in the (n−1)th frame in the frame memory 16, and also reads the drawing data to be displayed in the nth frame from the frame memory 16 by double buffering, performs D/A conversion by the D/A converter 17, and displays the computer graphics image on the video monitor 24. The sound processor 18, on the other hand, writes digital sound data to the sound memory 19 so as to output sound corresponding to the game scene, and reads this, performs D/A conversion, and outputs such sound as sound effects via the speaker 25.

Figure 5:
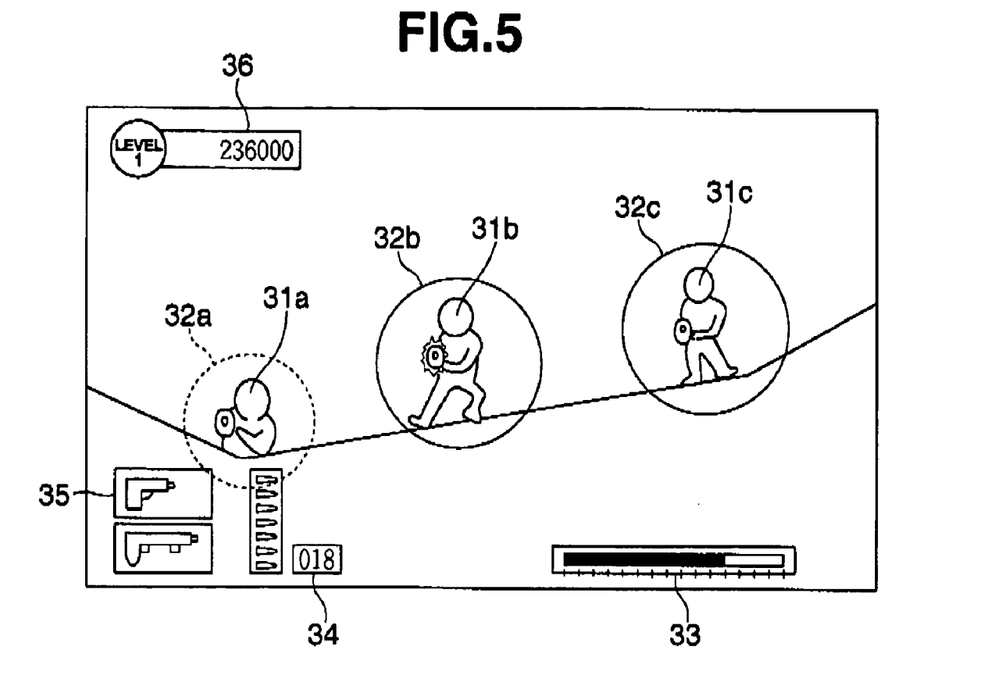
FIG. 5 is a diagram depicting the game screen in a shooting game.

FIG. 5 shows a screen example in the shooting game. In FIG. 5, 31a, 31b and 31c are enemy-characters, 32a, 32b and 32c are lock on cursors, 33 is the slow gauge, 34 is the remaining number of bullets that a player can fire, 35 is an icon to display weapons that can be selected, and 36 is the score that a player amassed. In the virtual space, a player character operated by the player is disposed in addition to the enemy-characters 31a, 31b and 31c shown in FIG. 5, and an image viewed from a predetermined virtual viewpoint is displayed on the video monitor 24 as a game screen. In this case, the virtual viewpoint is set near the head of the player-character, and an image viewed from the viewpoint of the player-character (subjective viewpoint) is displayed, but the image is not limited to this, and an image viewed from an objective viewpoint, where both the player-character and the enemy-characters 31a, 31b and 31c are displayed on the game screen, may be displayed (this is the same for the later mentioned description in FIG. 6). In this case, as FIG. 5 shows, an image viewed from the subjective viewpoint of the player-character is displayed.

The enemy-characters 31a, 31b and 31c are programmed so as to fire bullets at the player-character according to a predetermined attack pattern based on computer control. Each one of the lock on cursors 32a, 32b and 32c is a cursor which moves tracking each enemy-character 31a, 31b and 31c respectively, and the firing of a bullet from an enemy character 31a, 31b or 31c is shown to the player by changing the color from green (indicated by a dotted line) to red (indicated by a solid line). The present invention can be applied even if the lock on cursors 32a, 32b and 32c are not displayed. The slow gauge 33 will be described in detail later. In the example shown in FIG. 5, the lock on cursor 32a which is locked to the enemy-character 31a is displayed in green, but the lock on cursors 32b and 32c locked to the enemy characters 31b and 31c are displayed in red. If the enemy characters 31b and 31c fire bullets here, and if the aim matches with the coordinates of the player-character, the player is instantaneously shot and damaged, without any time to avoid the bullet. This is because it has been programmed such that the image of the player-character being shot is displayed in a frame next to the frame where the enemy characters 31b and 31c fired the bullets.

Therefore in the present invention, the visual effects processing is performed on the game screen under predetermined conditions (hereafter called "visual effects processing enable conditions") to provide the player extra time to avoid a bullet. The visual effects processing enable conditions are conditions to be prerequisites to perform the visual effects processing on the game screen, and, for example, these conditions are met when the status transits to the status where an attack from the enemy-character 31 starts, that is when the status transits to the bullet firing wait status, such as when the green color of the lock on cursor 32 changes to red. The main CPU 12 sets the visual effects processing enable flag to "1" in the work RAM 14 when the visual effects processing enable conditions are established (when the status transits to the bullet firing wait status). The visual effects processing is when, for example, when slow regeneration processing is performed only for the enemy-character 31 and the bullet by changing the time scale of the enemy-character 31 and the bullet fired by the enemy-character 31 to 1/n. By such visual effects processing, the operation speed of the player-character can be virtually quickened. In other words, the moving speed of the enemy-character and the bullet thereof become 1/n that of the player-character, so the player can avoid the bullet with sufficient extra time, and also the player can blast the bullet by aiming at this bullet. For the value of n, n=10 for example is preferable.

Figure 6:
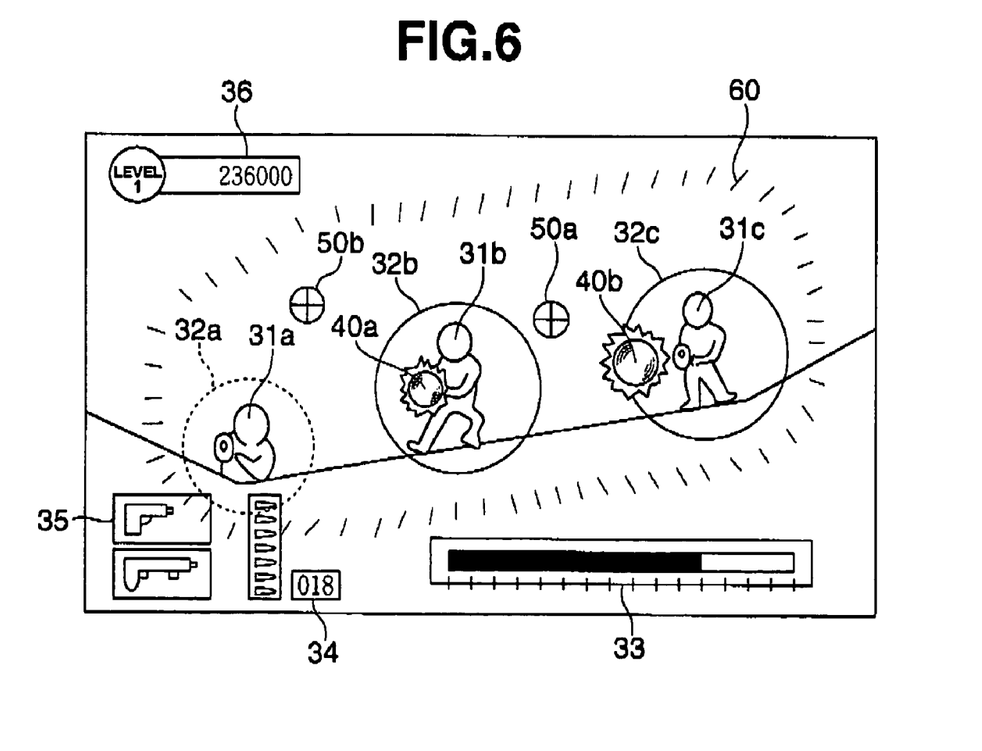
FIG. 6 is a diagram depicting the game screen in a shooting game.

FIG. 6 shows a screen example of a shooting game when the visual effects processing of the present embodiment is performed. Identical reference numerals as FIG. 5 indicate identical composing elements for which detailed explanations are omitted. When the lock on cursors 32b and 32c, locking the enemy characters 31b and 31c, turn from green to red, the visual effects processing enable conditions are established. Then shortly after this, the bullets 40a and 40b are fired from the enemy-characters 31b and 31c. If the player inputs a visual effects request when the visual effects processing enable conditions are established, the main CPU 12 generates a game screen where the visual effects processing is performed, so the player performs the desired processing, such as changing of the time scale. For the visual effects request input, a control signal, when the player inputs by stepping on the foot pedals 22 and 23, for example, is preferable. This foot control signal is output to the input/output interface 11 and is detected by the main CPU 12. However the visual effects request is not limited to foot pedals, but may be the input control of a switch for a visual effects request input, which is disposed on the gun type controllers 20 and 21. Also the visual effects request may be the input control of a switch for slow regeneration, which is disposed on the body of the game machine 10, without using the gun type controller. When the visual effects request input from the player is detected, the main CPU 12 converts the time scale for a predetermined object (the enemy-character 31 and bullet 40 in this case), and performs slow regeneration processing.

Then the bullets 40a and 40b, which have not been visually displayed, are displayed on the game screen in slow regeneration. In this case, many lines 60, which are like after images extending from the edge of the screen to an area roughly at the center, are displayed, which is image effects processing as if the player-character were virtually moving at high-speed. By this, the player can experience the sensation as if they were moving at high speed, and can avoid the bullets 40a and 40b with the extra time, since the moving speed of the enemy-characters 31b and 31c and the bullets 40a and 40b is slow, and the player also can blast the bullets 40a and 40b by adjusting the orientation of the gun type controllers 20 and 21, pulling the trigger switches 20a and 21a with aligning the aiming cursors 50a and 50b at the bullets 40a and 40b. Here the aiming cursor 50a is an aiming cursor of the player A, and the aiming cursor 50b is the aiming cursor of the player B. The blast processing of the bullet 40 by the aiming cursors 50a and 50b can be performed with a normal operation time. In other words, the time from the player executing the bullet firing operation to the bullet reaching the shooting target, the time from the player selecting a weapon displayed at the icon 35 to the weapon being displayed on the screen in response to the selection, and the display speed of an object related to player' operation, such as the moving time of the aiming cursors 50a and 50b, are based on the normal display speed before the visual effects processing is executed. The slow gauge 33 is for indicating the progress of time when slow regeneration processing, as the visual effects processing, can be executed, which is designed such that the value of the gauge decreases as the time for executing the visual effects processing elapses, and the visual effects processing cannot be executed as game processing if this value becomes 0. As FIG. 6 shows, the display of the slow gauge 33 is enlarged on screen while visual effects processing is being executed, where the remaining time, when the visual effects processing can be executed, is indicated for the player.

Figure 3:
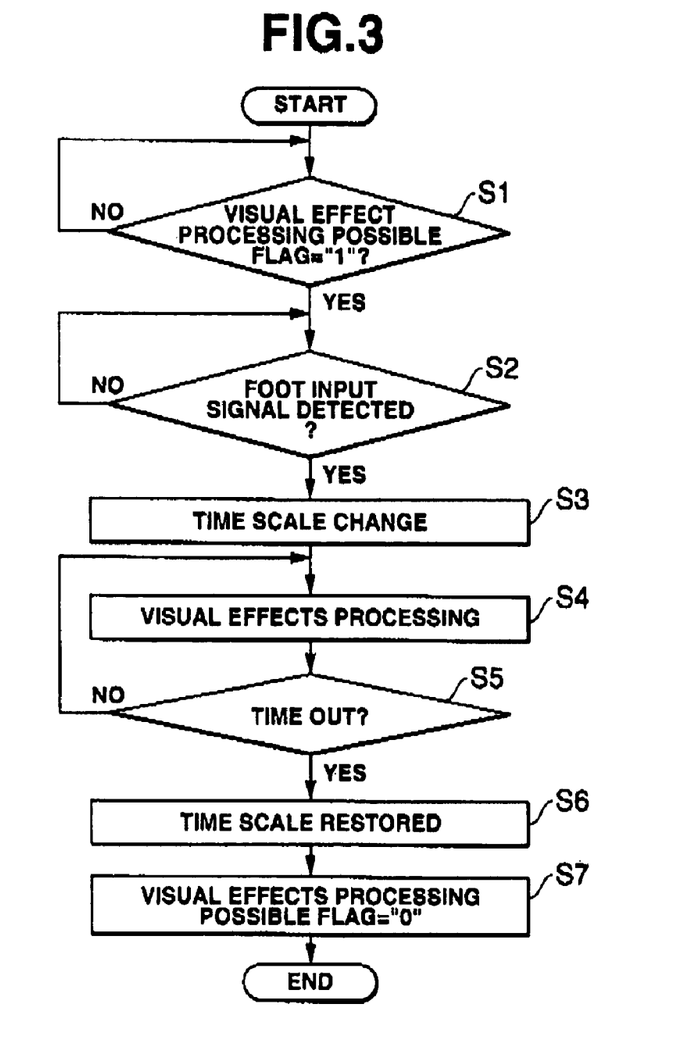
FIG. 3 is a flow chart depicting the procedure of visual effects processing of the present embodiment.

FIG. 3 is a flow chart depicting the procedure of the visual effects processing executed by the main CPU 12. At first, the main CPU 12 monitors the work RAM 14 and checks whether "1" is set at the visual effects processing enable flag (step S1). If it is detected that "1" is set at the visual effects processing enable flag (step S1: YES), the main CPU 12 checks whether the foot pedals 22 and 23 are stepped on, and the foot input signal is detected (step S2). If the stamp input signal is detected (step S2: YES), the main CPU 12 changes the time scale of a predetermined character (enemy-character 31 and bullet 40 in this case) to 1/n (step S3), and executes the visual effects processing based on slow regeneration (step S4). And if the time, when the visual effects processing can be executed in a status where the foot pedals 22 and 23 are stepped on, has elapsed (step S5: YES), the main CPU 12 returns the time scale of the above mentioned predetermined character to the original value (that is, time_ratio=1.0) (step S6), and sets the visual effects processing enable flag to "0" (step S7). This may be constructed such that the time scale of the above mentioned predetermined character is returned to the original value in the stage when the player releases their foot from the foot pedals 22 and 23, regardless the processing in step S5.

While the visual effects processing is performed, slow regeneration processing is executed only for the objects related to the enemy-character 31, and the speed of the player-character and the objects related to the operation of the player-character, such as the speed of the value of the slow gauge 33 decreasing, the speed of the remaining number of bullets 34 decreasing, the speed of the display mode of the icon 35, and the speed of the increasing/decreasing speed of the number of points of the acquired score 36, are at normal speed, for which it is programmed such that slow regeneration processing cannot be executed. In the above description, the moving speed of the enemy-character 31 and the bullet 40 fired by this enemy-character 31 are set to 1/n, and the moving speed of the objects related to the player's operation is maintained at 1.0, but the present invention is not limited to this, and it may be constructed such that the moving speed of the enemy-character 31 and the bullet 40 fired by the enemy-character 31 is set to 1/n, and the moving speed of the objects related to the player's operation are set to 1/m using n and m which relationship is n>m>1. In other words; the objects related to the player operation is also displayed somewhat slower, but the moving speed of the enemy-character 31 and the bullet 40 is regenerated slower than this.

When the duration of the visual effects processing exceeds a predetermined value, the value of the slow gauge 33 becomes 0, and visual effects processing can no longer be executed, but it may be constructed such that the value of the slow gauge 33 is increased according to the duration in normal operation status, where the visual effects processing is not performed. In this case, it can be programmed such that the maximum value of the slow gauge 33 is 6000 points (10 seconds if converted into time), and after a predetermined time (e.g. 2 seconds) has elapsed since the value of the slow gauge 33 becomes 0, the value of the slow gauge 33 is increased at every 2 points for 5 frames. If constructed in this way, the value of the slow gauge 33 recovers, so the player can use the visual effects processing again. In the case of the two player play mode, the recovery points of the slow gauge 33 may be set to be different from the recovery points of the one player play mode. It also may be constructed such that for the recovery processing of the slow gauge 33, a predetermined number of points (e.g. 4 points) are recovered if a bullet is fired at the enemy-character 31, a predetermined number of points (e.g. 8 points) are recovered if the enemy-character 31 is shot, a predetermined number of points (e.g. 1200 points) are recovered if a vital point of the enemy-character 31 is shot, and a predetermined number of points (e.g. 20 points) are recovered if the enemy-character 31 is hit continuously two or more times.

In this way, according to the present embodiment, only the enemy-character 31 and the bullet 40 are slow-regenerated by the player stepping on the foot pedals 22 and 23 when the visual effects processing enable conditions are established, so even a player whose game control is not very good can avoid the bullet 40, which allows implementing a shooting game that is not boring. If the player has an advanced skill level, the bullet 40 can be aimed at and blasted while the bullet 40 fired from the enemy-character 31 is slow-regenerated, so a more exciting shooting game can be provided. In the present embodiment, an example when the player-character and the enemy-character fight each other was shown, but the present invention is not limited to this, but can be applied, for example, to a shooting game where an object simulating a fighter aircraft or a combat vehicle are operated.

What is claimed is:

1. A computer program product, stored on a computer readable medium, for causing a computer system to execute processing for determining whether or not bullets that are virtually fired in response to an input operation of a player collide with an enemy-character that is computer-controlled, and processing for displaying a player-character and the enemy-character in a virtual space viewed from a virtual viewpoint on a screen, the computer program product causing the computer system to execute:

(a) determining whether or not a visual effect request about a time scale for requesting visual effect processing is input by a player;

(b) changing the time scale such that a display speed of at least the enemy-character and each one of the bullets fired from the enemy-character become slower when the visual effect request about the time scale is input, wherein the time scale changes regardless of whether the bullets fired hit a target;

(c) displaying circumstances in the virtual space viewed from the virtual viewpoint on the screen where the player-character and the enemy-character are located based on the changed time scale, wherein the time scale of the player-character in said displaying circumstances remains unchanged so that the speed of the player-character appears relatively faster than the speed of the enemy-character and the speed of each one of the bullets fired from the enemy-character;

(d) determining whether or not bullets that are virtually fired in response to an input operation of the player collide with the enemy-character being a shooting target or collide with bullets that are virtually fired from the enemy-character and are shooting targets;

(e) displaying an image of the shooting target being shot on the screen when bullets that are virtually fired responding to an input operation of the player collide with the shooting target;

(f) displaying a remaining time for the computer system to execute the changing of the time scale on the screen;

(g) decreasing the remaining time in proportion to an elapsed time in which the computer system executes the changing of the time scale;

(h) determining whether or not the remaining time is over;
(i) terminating the changing of the time scale when the remaining time is over;
(j) restoring the time scale to a normal value when the changing of the time scale is over;
(k) measuring an elapsed time in which the computer system does not execute the changing of the time scale; and
(l) increasing the remaining time in proportion to the elapsed time in which the computer system does not execute the changing of the time scale.

2. The computer program product according to claim 1, the computer program product causing the computer system to execute:
determining whether or not processing transitions to a bullet fire wait status where a bullet is fired from said enemy-character to a player-character at least within a predetermined time, and
determining whether or not the visual effect request for requesting visual effect processing is input by the player when processing transition to the bullet fire wait status.

3. The computer program product according to claim 2, the computer program product causing the computer system to execute:
determining whether or not a current mode is a mode where two or more players play, and
updating said remaining time so that an increased amount of said remaining time, when it is determined that the current mode is a mode where two or more players play, becomes different from an increased amount of said remaining time in a mode where one player plays.

4. The computer program product according to claim 1, the computer program product causing the computer system to execute:
determining whether or not the displaying of circumstances is being executed, and
executing image effect processing for changing a display mode of the enemy-character while the displaying of circumstances is executed.

5. The computer program product according to claim 1, wherein said visual effect request input is a control signal which is output to said computer system when a foot pedal connected to said computer system is stepped on by the player.

6. The computer program product according to claim 1, the computer program product causing the computer system to execute:
determining whether or not a plurality of bullets that are virtually fired in response to an input operation of the player consecutively collide with the enemy-character or with bullets that are virtually fired from the enemy-character; and
increasing the remaining time more when the plurality of bullets that are virtually fired in response to an input operation of the player consecutively collide with the enemy-character or with bullets that are virtually fired from the enemy-character than when the plurality of bullets that are virtually fired in response to an input operation of the player consecutively collide with neither the enemy-character nor bullets that are virtually fired from the enemy-character.

7. The computer program product according to claim 1, wherein the computer program product causes the computer system to further execute:
at (b), changing the time scale such that the display speed of the player-character become slower than normal, and the display speed of the enemy-character and the bullets are slower than the display speed of the player-character; and
at (c), displaying circumstances in the virtual space viewed from the virtual viewpoint on the screen where the player-character and the enemy-character are located based on the changed time scale, wherein the time scale of the player in said displaying circumstances is changed so that the speed of the player-character appears slower than usual and relatively faster than the speed of the enemy-character and the speed of each one of the bullets fired from the enemy-character.

8. A computer program product, stored on a computer-readable storage medium, for causing a computer system to execute processing for determining whether or not bullets that are virtually fired in response to an input operation of a player collide with an enemy-character that is computer-controlled, and processing for displaying a player-character and the enemy-character in a virtual space viewed from a virtual viewpoint on a screen, the computer program product causing the computer system to execute:
(a) determining whether or not a visual effect request about a time scale for requesting visual effect processing is input by a player;
(b) changing the time scale such that a display speed of at least the enemy-character and each one of the bullets fired from the enemy-character become slower when the visual effect request about the time scale is input, wherein the time scale changes regardless of whether the bullets fired hit a target;
(c) displaying circumstances in the virtual space viewed from the virtual viewpoint on the screen where the player-character and the enemy-character are located based on the changed time scale so that the speed of the player-character appears relatively faster than the speed of the enemy-character and the speed of each one of the bullets fired from the enemy-character;
(d) determining whether or not bullets that are virtually fired in response to an input operation of the player collide with the enemy-character being a shooting target or collide with bullets that are virtually fired from the enemy-character and are shooting targets;
(e) displaying an image of the shooting target being shot on the screen when bullets that are virtually fired responding to an input operation of the player collide with the shooting target;
(f) displaying a remaining time for the computer system to execute the changing of the time scale on the screen;
(g) decreasing the remaining time in proportion to an elapsed time in which the computer system executes the changing of the time scale;
(h) determining whether or not the remaining time is over;
(i) terminating the changing the time scale when the remaining time is over;
(j) restoring the time scale to a normal value when the changing of the time scale is over;
(k) measuring an elapsed time in which the computer system does not execute the changing of the time scale; and
(l) increasing the remaining time in proportion to the elapsed time in which the computer system does not execute the changing of the time scale.

9. The computer program product according to claim 8, wherein the computer program product causes the computer system to execute:
at (b), changing the time scale such that the display speed of the player-character become slower than normal, and the display speed of the enemy-character and the bullets are slower than the display speed of the player-character; and at (c), displaying circumstances in the virtual space viewed from the virtual viewpoint on the screen where the player-character and the enemy-character are located based on the changed time scale, wherein the time scale of the player-character appears slower than usual and relatively faster than the speed of the enemy-character and the speed of each one of the bullets fired from the enemy-character.

10. The computer program product according to claim 8, wherein the computer program product causes the computer system to execute:

determining whether or not a plurality of bullets that are virtually fired in response to an input operation of the player consecutively collide with the enemy-character or with bullets that are virtually fired from the enemy-character; and increasing the remaining time more when the plurality of bullets that are virtually fired in response to an input operation of the player consecutively collide with the enemy-character or with bullets that are virtually fired from the enemy-character than when the plurality of bullets that are virtually fired in response to an input operation of the player consecutively collide with neither the enemy-character nor bullets that are virtually fired from the enemy-character.

11. The computer program product according to claim 8, wherein the computer program product causes the computer system to execute:

determining whether or not processing transitions to a bullet fire wait status where a bullet is fired from said enemy-character to a player-character at least within a predetermined time, and determining whether or not the visual effect request for requesting visual effect processing is input by the player when processing transition to the bullet fire wait status.

12. A computer-implemented method for causing a computer to execute processing for determining whether or not bullets that are virtually fired in response to an input operation of a player collide with an enemy-character that is computer-controlled, and processing for displaying a player-character and the enemy-character in a virtual space viewed from a virtual viewpoint on a screen, the method comprising:

(a) determining, by the computer, whether or not a visual effect request about a time scale for requesting visual effect processing is input by a player;

(b) changing, by the computer, the time scale such that a display speed of at least the enemy-character and each one of the bullets fired from the enemy-character become slower when the visual effect request about the time scale is input, wherein the time scale changes regardless of whether the bullets fired hit a target;

(c) displaying, by the computer, circumstances in the virtual space viewed from the virtual viewpoint on the screen where the player-character and the enemy-character are located based on the changed time scale so that the speed of the player-character appears relatively faster than the speed of the enemy-character and the speed of each one of the bullets fired from the enemy-character;

(d) determining, by the computer, whether or not bullets that are virtually fired in response to an input operation of the player collide with the enemy-character being a shooting target or collide with bullets that are virtually fired from the enemy-character and are shooting targets;

(e) displaying, by the computer, an image of the shooting target being shot on the screen when bullets that are virtually fired responding to an input operation of the player collide with the shooting target;

(f) displaying, by the computer, a remaining time for the computer system to execute the changing of the time scale on the screen;

(g) decreasing, by the computer, the remaining time in proportion to an elapsed time in which the computer system executes the changing of the time scale;

(h) determining, by the computer, whether or not the remaining time is over;

(i) terminating, by the computer, the changing the time scale when the remaining time is over;

(j) restoring, by the computer, the time scale to a normal value when the changing of the time scale is over;

(k) measuring, by the computer, an elapsed time in which the computer system does not execute the changing of the time scale; and (l) increasing, by the computer, the remaining time in proportion to the elapsed time in which the computer system does not execute the changing of the time scale.

13. The computer-implemented method according to claim 12, the method further comprising:

at (b), changing the time scale such that the display speed of the player-character become slower than normal, and the display speed of the enemy-character and the bullets are slower than the display speed of the player-character; and at (c), displaying circumstances in the virtual space viewed from the virtual viewpoint on the screen where the player-character and the enemy-character are located based on the changed time scale, wherein the time scale of the player-character appears slower than usual and relatively faster than the speed of the enemy-character and the speed of each one of the bullets fired from the enemy-character.

14. The computer-implemented method according to claim 12, the method further comprising:

determining whether or not a plurality of bullets that are virtually fired in response to an input operation of the player consecutively collide with the enemy-character or with bullets that are virtually fired from the enemy-character; and increasing the remaining time more when the plurality of bullets that are virtually fired in response to an input operation of the player consecutively collide with the enemy-character or with bullets that are virtually fired from the enemy-character than when the plurality of bullets that are virtually fired in response to an input operation of the player consecutively collide with neither the enemy-character nor bullets that are virtually fired from the enemy-character.

15. The computer-implemented method according to claim 12, the method further comprising:

determining whether or not processing transitions to a bullet fire wait status where a bullet is fired from said enemy-character to a player-character at least within a predetermined time, and determining whether or not the visual effect request for requesting visual effect processing is input by the player when processing transition to the bullet fire wait status.

* * * * *

UNITED STATES PATENT AND TRADEMARK OFFICE
CERTIFICATE OF CORRECTION

PATENT NO.         : 7,837,552 B2
APPLICATION NO.    : 10/682418
DATED              : November 23, 2010
INVENTOR(S)        : Sumi et al.

It is certified that error appears in the above-identified patent and that said Letters Patent is hereby corrected as shown below:

In claim 2, column 9, line 21, "processing transition" should read --processing transitions--.

In claim 7, column 9, line 67, "become slower" should read --becomes slower--.

In claim 9, column 10, line 67, "become slower" should read --becomes slower--.

In claim 11, column 11, line 38, "processing transition" should read --processing transitions--.

In claim 13, column 12, line 28, "become slower" should read --becomes slower--.

In claim 15, column 12, line 64, "processing transition" should read --processing transitions--.

Signed and Sealed this
Tenth Day of May, 2011

David J. Kappos
*Director of the United States Patent and Trademark Office*